United States Patent Office 2,717,896
Patented Sept. 13, 1955

2,717,896

CERTAIN 4(LOWER ALKYL CARBOXYLIC ACID ACYL) CARBETHOXYPIPERAZINES

Leon Goldman, River Edge, N. J., assignor to American Cyanamid Company, New York, N. Y., a corporation of Maine No Drawing. Application March 2, 1953, Serial No. 339,925

8 Claims. (Cl. 260—268)

The present invention relates to new 1,4-disubstituted piperazines. More particularly, it relates to 1-carbethoxy-4-acylpiperazines and methods of preparing the same.

In my copending application, Serial Number 204,095, filed January 2, 1951, now abandoned, of which the present application is a continuation-in-part, I described certain 1,4-disubstituted piperazines which were physiologically active. After diligent and careful stndy of these and related compounds it has now been found that those compounds having a carbethoxy group in the 1-position and an acyl radical of 4 to 6 carbon atoms in the 4-position on the piperazine nucleus have outstanding sedative activity. In possessing this activity these compounds will be useful in treating those conditions where general sedation is desired.

The new piperazines of the present invention may be illustrated by the following general formula:

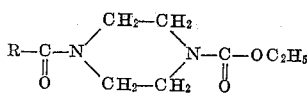

in which R is an alkyl radical having 3 to 5 carbon atoms.

The compounds of the present invention, in general, are liquids at room temperature. They have relatively high boiling points and are, in general, readily soluble in organic solvents, for example, benzene, lower aliphatic alcohols, ether or ethyl acetate.

The preparation of the new componnds of the present invention may be accomplished by reacting a 1-carbethoxypiperazine with carboxylic acid acyl halide having 4 to 6 carbon atoms or the anhydride of the corresponding acid. The conditions for carrying out the reaction will vary somewhat depending upon the particular intermediates used in the reaction and will be described hereinafter.

The intermediate 1-carbethoxypiperazine is a known compound, the preparation of which is described in the chemical literature.

The other intermediates used in the present reaction may be acid chlorides such as n-butyryl chloride, isobutyryl chloride, n-valeryl chloride, isovaleryl chloride, alpha-methylbutyryl chloride, beta-methylvaleryl chloride, etc. The reaction can also be made to take place using the corresponding acid anhydrides such as n-butyric anhydride, n-valeric anhydride, and the like.

In preparing the compounds of the present invention I prefer to carry out the reaction in an anhydrous solvent such as, for example, anhydrous ether, absolute ethyl acetate or benzene. Under some conditions, depending upon the intermediates used, the reaction can also be carried out in a substantially aqueous solvent in the presence of an alkaline substance which acts as an acceptor for the hydrohalogen acid liberated in the course of the reaction.

The reaction is preferably carried out at room temperature although I can use any temperature from about −10° C. to 100° C. At the above temperatures the reaction is usually complete in a matter of a few minntes up to several hours. A typical reaction when using anhydrous conditions is carried out by mixing the intermediates in the solvent at room temperature, allowing the reaction to take place at room temperature and if desired, then heating the mixture at a temperature up to 100° C.

The sedative activity of the compounds of the present invention was determined by their ability to cause sedation in subjects previously stimulated with ephedrine. The results obtained when an equal quantity of drug is administered is shown in the following table:

TABLE

| Compound | Dosage (mgm./Kgm.) | Activity |
|---|---|---|
| 1-Carbethoxy-4-propionylpiperazine | 500 | 0 |
| 1-Carbethoxy-4-n-butyrylpiperazine | 500 | 4 |
| 1-Carbethoxy-4-isobutyrylpiperazine | 500 | 4 |
| 1-Carbethoxy-4-n-valerylpiperazine | 500 | 2 |
| 1-Carbethoxy-4-isovalerylpiperazine | 500 | 4 |
| 1-Carbethoxy-4-alpha-methylbutyrylpiperazine | 500 | 4 |
| 1-Carbethoxy-4-beta-methylvalerylpiperazine | 500 | 3 |
| 1-Carbethoxy-4-benzoylpiperazine | 500 | 0 |

The activity ranges from zero, indicating practically no sedation to four, indicating sedation sufficient to control completely the excitement due to ephedrine.

The following examples describe in greater detail the preparation of representative 1-carbethoxy-4-acyl piperazines within the scope of the present invention.

Example 1

To a solution of 31.6 g. (0.2 mole) of 1-carbethoxypiperazine in 150 ml. of anhydrous ether was added, with shaking, 21.3 g. (20.7 ml., 0.2 mole) of n-butyryl chloride. The reaction proceeded vigorously, with formation of a colorless precipitate of 1-carbethoxypiperazine hydrochloride, until one-half of the n-butyryl chloride had been added. After refluxing 5 hours a solution of 31.6 g. (0.2 mole) of 1-carbethoxypiperazine in 25 ml. of anhydrous ether was added. The reaction mixture was refluxed an additional 3 hours. After cooling, the mixture was filtered. The ether was evaporated from the filtrate and the residual syrup was filtered from a small amount of precipitate. The filtrate was distilled under reduced pressure and the 1-carbethoxy-4-n-butyrylpiperazine distilled as a colorless liquid, boiling point 136°–138.5° C. at 0.6 mm. The yield was 34.5 g. (76% of the theoretical amount.

Example 2

A cold solution of 150 g. of 1-carbethoxypiperazine in one liter of anhydrous ethyl acetate was treated with dropwise addition of 50 g. of isobutyryl chloride. After one and one-half hours at room temperature the reaction was filtered to remove 91.9 g. of colorless crystals of 1-carbethoxypiperazine hydrochloride. The filtrate was distilled at atmospheric pressure to remove the ethyl acetate and then the residual liquid was distilled under reduced pressure. The 1-carbethoxy-4-isobutyrylpiperazine (89 g.) distilled as a colorless liquid, boiling point 124° C. at 0.2 mm.

Example 3 n-Valeric anhydride (25 g.) was added, with cooling, to 21.2 g. of 1-carbethoxypiperazine and the resulting solution was heated on a steam bath for two and one-half hours. The solution was then distilled under reduced pressure and after the n-valeric acid had distilled the 1-carbethoxy-4-n-valerylpiperazine was collected. The yield of colorless liquid, boiling point 157–158° C. at 0.6 mm., was 28.2 g.

Example 4

To a chilled solution of 63.3 g. of 1-carbethoxypiperazine in 350 ml. of anhydrous ether, 24.1 g. of isovaleryl chloride was added dropwise. After standing overnight at room temperature, the reaction mixture was filtered to remove 37 g. of colorless crystals of 1-carbethoxypiperazine hydrochloride. The filtrate was washed with water, dried over Drierite, and distilled on a steam bath to remove the ether. The residual liquid was distilled under reduced pressure to yield 34.5 g. of 1-carbethoxy-4-isovalerylpiperazine which was obtained as a pale yellow liquid, boiling point 121°–122° C. at 0.15 mm.

Example 5

DL-alpha-methyl-n-butyryl chloride (9.2 g.) was added in portions, with cooling, to a solution of 24.2 g. of 1-carbethoxypiperazine in 125 ml. of anhydrous ether. After one day at room temperature the reaction was filtered to remove 14.1 g. of 1-carbethoxypiperazine hydrochloride. The ethereal filtrate was washed with dilute hydrochloric acid saturated with sodium chloride, with saturated sodium chloride, and finally with 5% sodium bicarbonate and dried over anhydrous magnesium sulfate. The filtered, dried solution was distilled on a steam bath to remove the ether and the residual liquid was then distilled under reduced pressure to yield 14.3 g. of 1-carbethoxy-4-DL-alpha-methyl-n-butyrylpiperazine, a colorless liquid boiling at 128°–132° C. at 0.08–0.10 mm.

Example 6

DL-beta-methylvaleryl chloride (13.5 g.) was carefully added, with cooling, to an iced solution of 34.8 g. of 1-carbethoxypiperazine in 250 ml. of anhydrous ether. After standing one day at room temperature the mixture was filtered to remove 19.6 g. of 1-carbethoxypiperazine hydrochloride. The filtrate was washed with N hydrochloric acid, water and 5% sodium bicarbonate and dried over anhydrous magnesium sulfate. The dried solution was heated on a steam bath to remove the ether. The residual liquid was distilled under reduced pressure to yield 22.3 g. of 1-carbethoxy-4-DL-beta-methylvalerylpiperazine, a colorless liquid, boiling point 137°–140° C. at 0.04 mm.

Example 7

To a solution of 31.6 g. (0.2 mole) of 1-carbethoxypiperazine in 100 ml. of benzene, 26 g. (0.2 mole) of propionic anhydride was added, while cooling. The resulting solution was refluxed on a steam bath for three and one-half hours. The solvents were removed under reduced pressure and the residual liquid was distilled under reduced pressure, yielding 16.9 g. of 1-carbethoxy-4-propionyl-piperazine, which distilled as a colorless liquid, boiling point 145°–149° C. at 0.3 mm.

I claim:

1. Compounds of the group having the general formula:

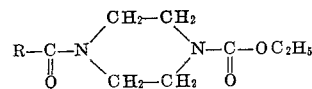

in which R is an alkyl radical having 3 to 5 carbon atoms.
2. 1-carbethoxy-4-n-butyrylpiperazine.
3. 1-carbethoxy-4-n-valerylpiperazine.
4. 1-carbethoxy-4-isovalerylpiperazine.
5. 1-carbethoxy-4-alpha-methylbutyrylpiperazine.
6. 1-carbethoxy-4-beta-methylvalerylpiperazine.
7. Compounds in accordance with claim 1 in which R is a butyryl radical.
8. Compounds in accordance with claim 1 in which R is a valeryl radical.

References Cited in the file of this patent

Stewart et al.: J. Org. Chem. 13, 138–139 (1948).